(12) United States Patent  
Wolfe

(10) Patent No.: US 6,700,713 B2  
(45) Date of Patent: Mar. 2, 2004

(54) LENS OPTIMIZATION FOR IMAGE PROJECTION SYSTEMS

(75) Inventor: Charles Robert Wolfe, Palo Alto, CA (US)

(73) Assignee: Jenmar Visual Systems, Fremont, CA (US)

(*) Notice: Subject to any disclaimer, the term of this patent is extended or adjusted under 35 U.S.C. 154(b) by 0 days.

(21) Appl. No.: 10/211,785

(22) Filed: Aug. 1, 2002

(65) Prior Publication Data

US 2004/0021955 A1 Feb. 5, 2004

(51) Int. Cl.[7] .............................. G02B 3/08; G02B 21/06
(52) U.S. Cl. ...................................... 359/742; 359/457
(58) Field of Search .................................. 359/457, 613, 359/741, 742

(56) References Cited

U.S. PATENT DOCUMENTS 4,824,227 A * 4/1989 Goldenberg et al. ........ 359/742  
6,046,814 A * 4/2000 Karlsson et al. ............ 359/457

* cited by examiner

Primary Examiner—David N. Spector  
(74) Attorney, Agent, or Firm—Fenwick & West LLP

(57) ABSTRACT

Method and apparatus for collimating light of projected images establishes limited few designs of Fresnel lenses to accommodate conventional projection systems having a wide range of sizes of viewing screens for the ted images. A multi-layer image-enhancing filter is disposed to receive Substantially collimated image light exiting the Fresnel lens.

14 Claims, 4 Drawing Sheets

LENS OPTIMIZATION FOR IMAGE PROJECTION SYSTEMS

FIELD OF THE INVENTION

This invention relates to image projection systems and more specifically to light-collimating lenses and associated image-enhancing light filters for displaying projected images over large-area display screens.

BACKGROUND OF THE INVENTION

Certain contemporary large-screen video displays commonly rely upon image projection onto the rear surface of a display screen. Several forms of rear-projection screens have emerged ranging from slightly translucent diffusers to more complex multi-layer optical filters that modify viewing angles, image contrast, and the like, attributable to particular layered structures of such filters. Image-enhancing filters of this type are described in the literature. (See, for example, U.S. Pat. No. 6,076,933 and U.S. Pat. No. 5,781,344.)

One common requirement of image-enhancing viewing screens in such applications is the need for substantially collimated light of the projected image incident upon the rear surface of the viewing screen. This may be accomplished approximately, but not commercially practically, in projection systems that project an image over a great distance. More commonly and practically, Fresnel lenses are introduced into an image projection system to optically reform the path of image light from a projected cone of diverging light rays into a substantially collimated pattern of parallel light rays incident upon the rear surface of the viewing screen. Of course, the path of projected image light may be optically folded and otherwise manipulated using reflectors and supplementary lenses within associated cabinetry in order to provide substantially collimated incident light images to the rear surface of a viewing screen.

Light-image projection systems have selected physical characteristics including a certain projection distance and a certain diagonal dimension from which an "f" number, or f/#, may be determined as the ratio of projection distance (from the projector to the viewing screen) to the diagonal dimension of the focused projected image. The practical necessity of shortened projection distances for convenient enclosure within modest-size cabinetry is exacerbated by popular demands for larger viewing screen that now result in f/#'s for projection systems which are commonly less than 1.

Additionally, a Fresnel lens has a maximum diagonal dimension of its active lens area, and has a selected focal distance from which an f/# for the lens can be similarly calculated as the ratio of the focal distance to the diagonal dimensions of the lens area Ideally, the f/# of the projection system should substantially match the f/# of the Fresnel lens to assure that the projected image light emerges from the Fresnel lens as substantially collimated rays incident on the rear surface of the viewing screen. However, such matching of f/#'s over a range of diagonal screen sizes and projection lengths within acceptable cabinet sizes commonly requires numerous Fresnel lenses of different sizes and designs for requisite matching of the applicable f/#'s. And, since tooling for forming Fresnel lenses is complex and expensive, it is desirable to minimize the required variations in sizes and lens designs commonly needed to match wide ranges of projection systems.

SUMMARY OF THE INVENTION

In accordance with the present invention, mismatching of projection and lens f/#'s within tolerable limits are resolved with negligible visible degradation of the projected image viewed through an image-enhancing filter. Specifically, a multi-layered image-enhancing filter including layers of transmissive beads and masking and index-matching materials, for example, as described in the aforementioned patents, can tolerate significant amounts of off-axis image (i.e., non-collimated) light with only negligible reduction in image quality. Accordingly, tolerable mismatching of projection distance and focal length of the Fresnel lens is utilized in combining a few Fresnel lens designs with a wide range of projection systems. In addition, the overall range of viewing screen sizes up to approximately 5 feet diagonally is divided into sub-ranges that require Fresnel lenses which are each designed around parameters at the mid-range of each such sub-range. This reduces the number of different lens designs required to substantially match the f/#'s of Fresnel lenses with the f/#'s of the projection systems required to produce images variously of about 40" to 70" diagonal dimensions on viewing screens in conventional height-width aspect ratios of 3:4 and 9:16.

DETAILED DESCRIPTION OF THE INVENTION

Figure 1:
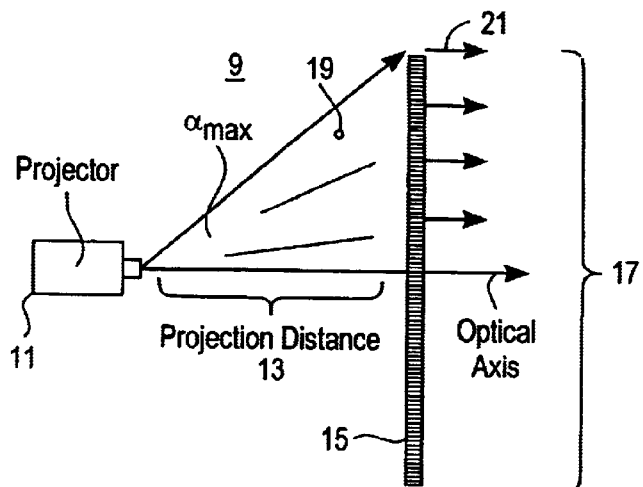
FIG. 1 is a pictorial illustration of a light-image projection system.

Referring now to FIG. 1, there is shown a pictorial illustration of a projection system 9 including a projector 11 that projects an image over a projection distance 13 on to a Fresnel lens 15 to produce a light image on the rear or incident surface of the lens 15 with a diagonal dimension 17. The angle $\alpha$ of incident light varies continuously across the surface of the lens 15 from a minimum of zero degrees on the optical axis and increasing with distance from the optical axis of the lens 15, up to a maximum angle of, for example, about 55° at the outer limit of the projected image. The f/# of the projection system is therefore determined by the ratio of projection distance 13 to diagonal dimension 17 (or diameter of the circular projected image), and the maximum $\alpha$ angle is determined by:

$$\alpha_{max} = \text{arc tan (screen diagonal/2 throw distance)} \quad \text{(Eq. 1)}.$$

Figure 2:
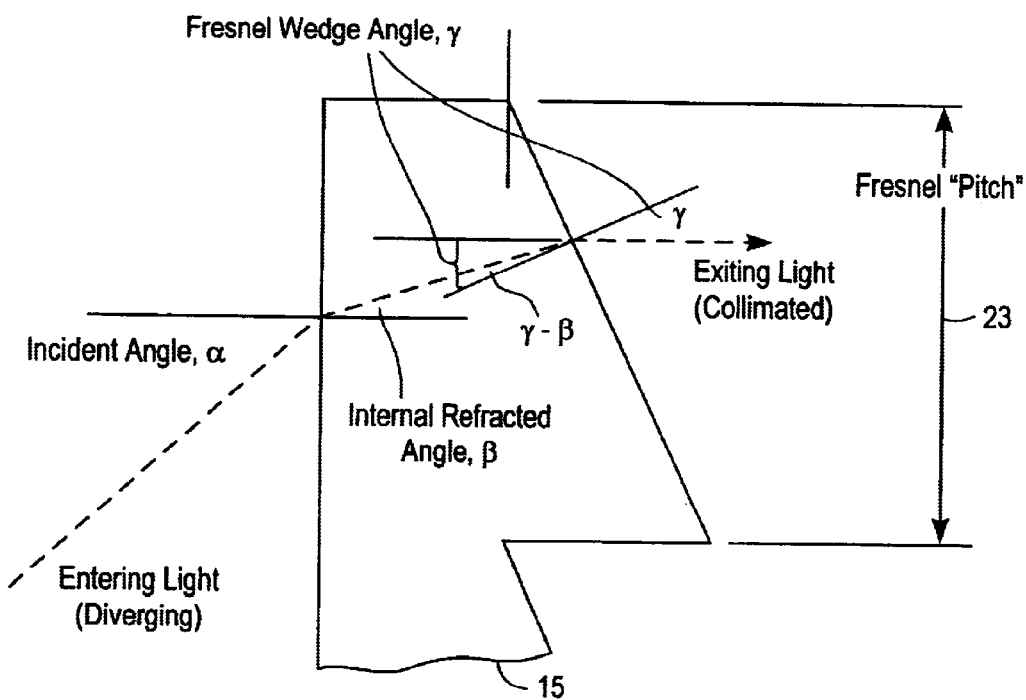
FIG. 2 is a pictorial illustration of a section of a Fresnel lens showing a refracted ray trace of the incident and exiting light beams.

To correct the incident projected image within the cone angle 19 to collimated light 21 at the outlet side of the Fresnel lens 15, the incident light entering the lens of angle $\alpha$ is internally refracted within the structure of the lens, as illustrated in FIG. 2, to exit as substantially collimated light per sector, or pitch 23 of the lens 15. In conventional manner for a Fresnel lens, the wedge angle, δ, per pitch varies with distance from the optical axis of the lens and is determined in accordance with Snell's law:

at the incident surface:

$$\sin \alpha = n \sin \beta \quad \text{(Eq. 2)}$$

at the exit surface:

$$n \sin \beta(\delta-\beta) = \sin \beta \quad \text{(Eq. 3)}$$

$$\sin \delta \cos \beta - \cos \delta \sin \beta = (\sin \delta/n) \quad \text{(Eq. 4)}$$

$$\cos \beta(\sin \delta)/(\cos \delta) - \sin \beta = (\sin \delta)/(n \cos \delta) \quad \text{(Eq. 5)}$$

$$(\tan \delta)(\cos \beta - 1/n) = \sin \beta \quad \text{(Eq. 6)}$$

$$\tan \delta = \sin \beta/(\cos \beta - 1/n) \quad \text{(Eq. 7)}$$

Figure 3:
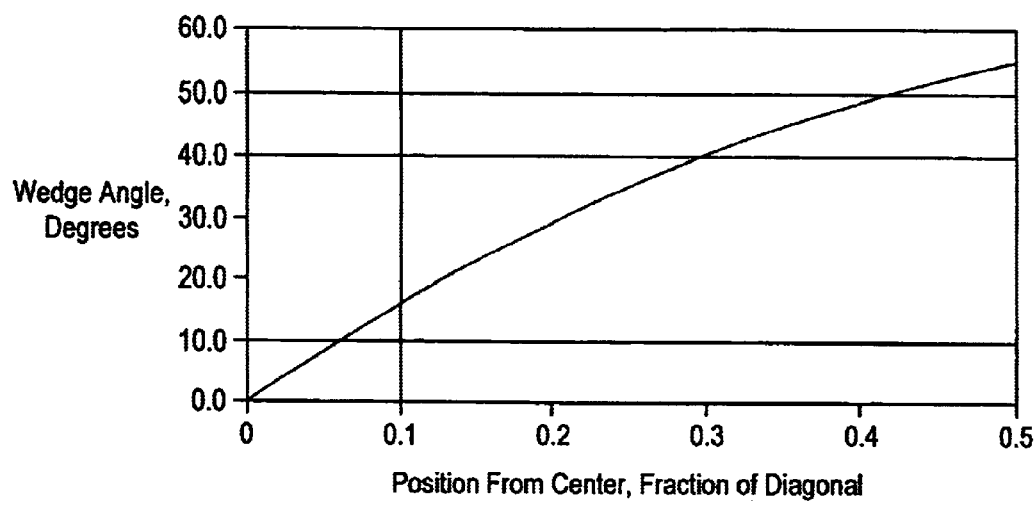
FIG. 3 is a graph illustrating variations of wedge-angle as a function of distance from the optical axis of a Fresnel lens.
Figure 4:
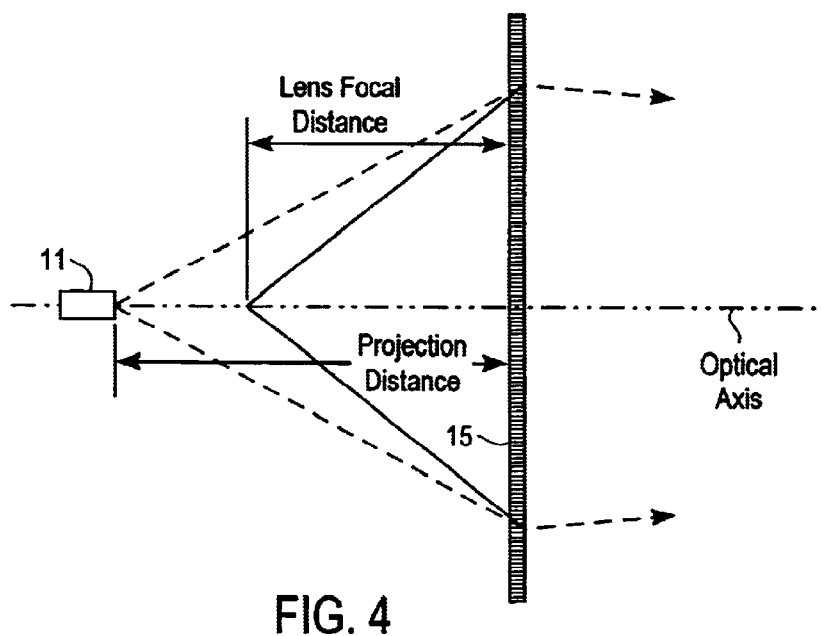
FIG. 4 is a pictorial illustration of image projection in a system having a lens focal distance shorter than the projection distance.

The maximum incident angle α of projected light occurs at the maximum distance from the optical axis of the lens 15, as illustrated in FIG. 3. For a square or rectangular lens 15, this maximum incident angle occurs at peripheral corners of the lens 15. For a conventional projection system that typically is designed to be f/0.80, the Fresnel lens may have an f/# smaller than the projection system f/# (e.g., f/0.73), and result in a configuration, as illustrated in FIG. 4, in which the projection distance is greater than the focal distance of the lens. In this configuration, the maximum incident angle α of the projected image can be shown to be about 32.0° and the maximum wedge angle δ can be shown to be about 52.6° for a maximum internal refraction angle β of about 20.8°.

Similarly, for a typical Fresnel lens in this configuration that is designed to be f/0.73, the maximum incident angle can be shown to be 34.4°, and the maximum wedge angle δ is 55.2° for a maximum internal refraction angle β of about 22.3°. Thus, in this configuration, the wedge angle required by the projection system is less than the wedge angle of the lens which results in convergent transmission of the exit light at an angle related to the difference of these wedge angles.

Figure 5:
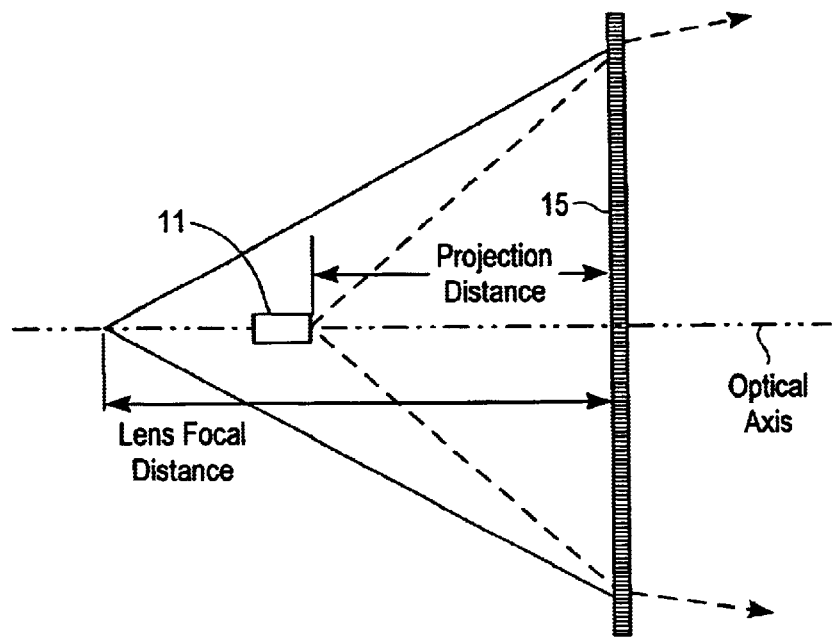
FIG. 5 is a pictorial illustration of image projection in a system having a lens focal distance longer than the projection distance.

Referring now to the conventional projection system of FIG. 5 in which the Fresnel lens is designed to be f/0.87. In this configuration, the focal length of the lens is greater than the projection distance, and maximum incident angle α of the lens is 29.9° and its maximum wedge angle δ is 50.2° for maximum internal refraction angle β of 19.5°. Thus, in this configuration the wedge angle δ required by the projection system is greater than the wedge angle of the lens which results in divergent transmission of the exit light at an angle related to the difference of these wedge angles.

For a given projection system of f/0.80, Fresnel lenses having a range of f/#'s approximating f/0.80 may be used to substantially collimate the exit light of the projected image. For a given lens focal length, the sizes of such lenses may be selected in accordance with the present invention to accommodate the variations in the screen sizes of the associated projection system.

Specifically, for projection distances (ranging from about 39" to 56") and screen sizes (ranging from about 40" to 70") associated with conventional projection video display systems designed to be f/0.80, then the appropriate lens f/# can be calculated, as set out in Table 1.

TABLE 1 f/# variation of the optimum f/0.73 lenses when cut to smaller screen sizes

| Screen diagonal, inches | Screen diagonal, mm | Projection distance, inches | Projection distance, mm | Lens f/# |
|---|---|---|---|---|
| 70 | 1778.0 | 56 | 1300.5 | 0.73 |
| 69 | 1752.6 | 56 | 1300.5 | 0.74 |
| 68 | 1727.2 | 56 | 1300.5 | 0.75 |
| 67 | 1701.8 | 56 | 1300.5 | 0.76 |
| 66 | 1676.4 | 56 | 1300.5 | 0.78 |
| 65 | 1651.0 | 56 | 1300.5 | 0.79 |
| 64 | 1625.6 | 56 | 1300.5 | 0.80 |
| 63 | 1600.2 | 56 | 1300.5 | 0.81 |
| 62 | 1574.8 | 56 | 1300.5 | 0.83 |
| 61 | 1549.4 | 56 | 1300.5 | 0.84 |
| 60 | 1524.0 | 56 | 1300.5 | 0.85 |
| 59 | 1498.6 | 56 | 1300.5 | 0.87 |
| 58 | 1473.2 | 46.4 | 1077.0 | 0.73 |
| 57 | 1447.8 | 46.4 | 1077.0 | 0.74 |
| 56 | 1422.4 | 46.4 | 1077.0 | 0.76 |
| 55 | 1397.0 | 46.4 | 1077.0 | 0.77 |
| 54 | 1371.6 | 46.4 | 1077.0 | 0.79 |
| 53 | 1346.2 | 46.4 | 1077.0 | 0.80 |
| 52 | 1320.8 | 46.4 | 1077.0 | 0.82 |
| 51 | 1295.4 | 46.4 | 1077.0 | 0.83 |
| 50 | 1270.0 | 46.4 | 1077.0 | 0.85 |
| 49 | 1244.6 | 46.4 | 1077.0 | 0.87 |
| 48 | 1219.2 | 39.2 | 894.1 | 0.73 |
| 47 | 1193.8 | 39.2 | 894.1 | 0.75 |
| 46 | 1168.4 | 39.2 | 894.1 | 0.77 |
| 45 | 1143.0 | 39.2 | 894.1 | 0.78 |
| 44 | 1117.6 | 39.2 | 894.1 | 0.80 |
| 43 | 1092.2 | 39.2 | 894.1 | 0.82 |
| 42 | 1066.8 | 39.2 | 894.1 | 0.84 |
| 41 | 1041.4 | 39.2 | 894.1 | 0.86 |
| 40 | 1016.0 | 39.2 | 894.1 | 0.88 |

From Table 1, it should be noted that a range of lens f/#'s calculated in this manner center around a match with the projection system of f/0.80 for projection distance of 56" and screen diagonal dimensions ranging from about 59" to 70". Similarly, it should be noted that the same range of lens f/#'s can be calculated in this manner centered around a match with the projection systems of f/0.80 for smaller projection distances of about 46.4" and screen diagonal dimensions ranging from about 49" to 58". Additionally, substantially the same range of lens f/#'s can be calculated in this manner centered around a match with the projection systems of f/90.80 for smaller projection distances of 39.2" and screen diagonal dimensions ranging from 40" to 48". For Fresnel lenses with f/#'s not matching the f/# of the projection system, the projected image light exiting the lens will not be collimated but instead will diverge or converge, as illustrated in FIGS. 4 and 5. It has been determined that multi-layer image enhancing filters, fog example, of the type described in the aforementioned patents, function suitably well with off-axis image (i.e., non-collimated) light from mismatched projection system f/#'s and lens f/#'s by up to about ±25% without significant degradation of the viewable image. Thus, such image-enhancing light filters 27 may be disposed to receive the projected image light exiting from Fresnel lenses that are designed to f/# 0.73 in only three size ranges for substantial match with projection systems of f/0.80 in typical 3 sizes of projection distances from 39.2" to 56", as grouped for illustration in Table 1. Thus, one Fresnel lens of f/0.73 and 70" diagonal size can provide adequately collimated light in projection systems of f/0.80 projection distance of 56" for a range of lens sizes from 70" through smaller lenses cut therefrom down to 59", with only ±0.07 mismatch in f-numbers, or not more than 10% variation over this range of lens sizes. Similarly, another Fresnel lens of f/0.73 and 58" diagonal screen size can provide adequately collimated light in projection systems of f/0.80 and projection distance of 46.4" for a range of lens sizes from 58" through smaller lenses cut therefrom down to 49", with only ±0.07 mismatch in f-numbers, or not more than ±10% variation over this range of lens sizes. Additionally, one more Fresnel lens of f/0.73 and 48" diagonal screen size can provide adequately collimated light in projection systems of f/0.80 and projection distance of 39.2" for a range of lens sizes from 48" through smaller lenses cut therefrom down to 40", with only ±0.08 mismatch in f-numbers, or not more than ±10% variation over this range of lens sizes. Each of these three Fresnel lenses can also accommodate screen sizes within the associated grouping of screen sizes, in 3:4 and 9:16 aspect ratios of the maximum height and width dimensions, as shown in Table 2. The Fresnel lens 15 is commonly formed as a substantially flat sheet of a material such as polycarbonate or methyl methacrylate, with a substantially circular pattern of the concentric pitch segments 23 formed at least in the exit surface. Such material can be cut conveniently from a sheet containing the largest size of Fresnel lens per size group into the population of smaller lenses per such size group, as set forth in Tables 1 and 2.

TABLE 2

Maximum height and width for 3:4 lenses and the maximum height and width possible from them in 9:16 aspect ratio

| 3:4 aspect ratio | | | 9:16 aspect ratio | | |
| --- | --- | --- | --- | --- | --- |
| Diagonal, inches | Height | Width | Diagonal, inches | Height | Width |
| 70.0 | 42.0 | 56.0 | 64.3 | 31.5 | 56.0 |
| 58.0 | 34.8 | 46.4 | 53.2 | 26.1 | 46.4 |
| 48.0 | 28.0 | 38.4 | 44.1 | 21.6 | 38.4 |

Figure 6:
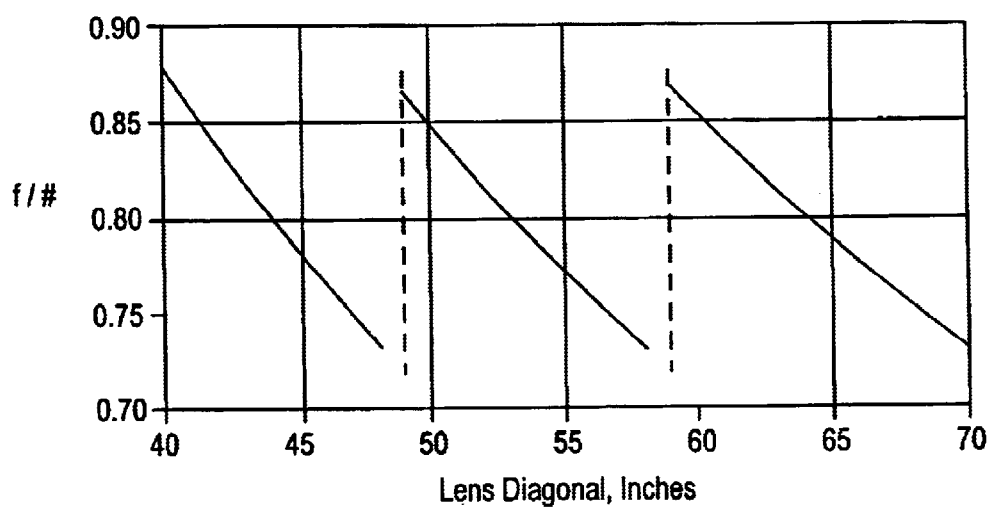
FIGS. 6–7 are graphs illustrating f/# variations of lenses required in image projection systems to provide collimated exit illumination over a range of screen sizes.

The three such designs of Fresnel lenses accommodate a range of screen sizes in projection systems of f/0.80, as graphically illustrated in FIG. 6.

Figure 7:
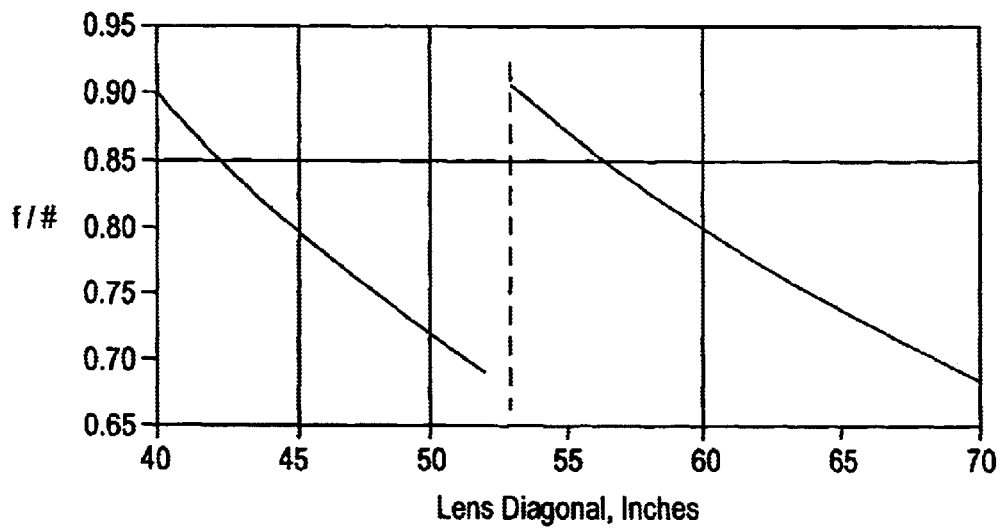

In another embodiment of the present invention, as illustrated in the graph of FIG. 7, the entire range of screen diagonal dimensions from 40" to 70" in projection systems of f/0.80 can be accommodated with two Fresnel lenses, designed as described above. Specifically, one lens of f/0.69 and diagonal dimension of 70" can accommodate smaller lens sizes cut therefrom down to 53" with only about ±0.11 variation in mismatch of f/#'s over the range of lens sizes. Additionally, another Fresnel lens of f/0.69 and diagonal dimension of 52" can accommodate smaller lens sizes cut therefrom down to 40" with only about ±0.11 mismatch of f/#'s, or not more than about ±14% variation over this range of lens sizes.

Figure 8:
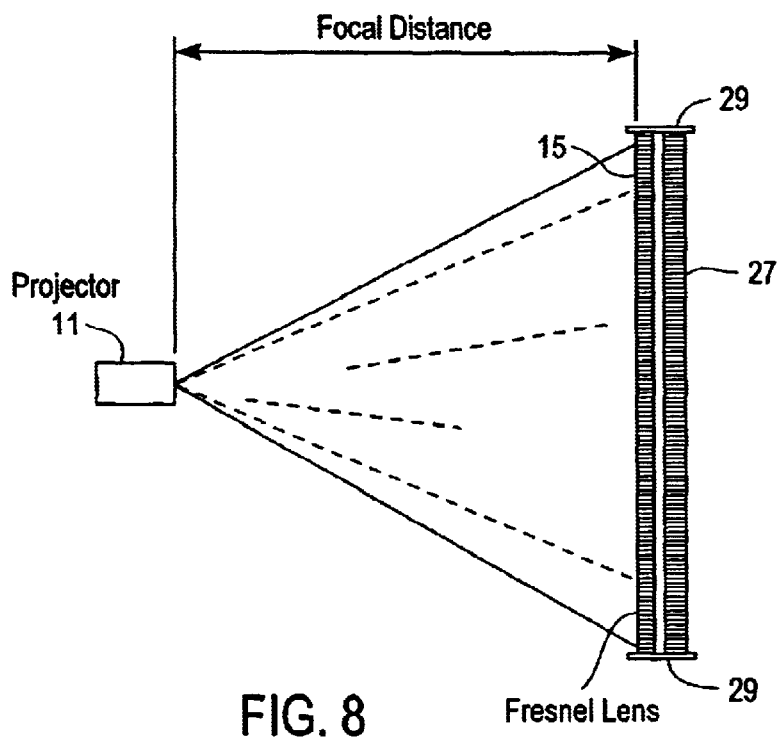
FIG. 8 is a pictorial illustration of an image projection system and associated lens and image-enhancing filter assembled according to the present invention.

In each of the embodiments of the present invention, a multi-layer, image-enhancing light filter 27, for example, of the type described in the aforementioned patents, is disposed in spaced relationship to the Fresnel lens 15 to receive the exit light of a projected image transmitted through the Fresnel lens 15. As illustrated in FIG. 8, the Fresnel lens 15 and the light filter 27 are typically mounted together 29 with very small air space therebetween.

Therefore, the present invention establishes designs of Fresnel lenses suitable for substantially collimating projected light images over a wide range of dimensions of display screens for viewing the projected image. This results in substantial savings on costs of tooling required to produce only a few lens designs that can accommodate a wide range of screen sizes in conventional image display systems.

I claim:

1. A Fresnel lens having an image transmission area and design parameters from which a population of Fresnel lenses of different f/#'s may be formed for interposing in a projection system having a selected f/#, the lens comprising:

a light transmission area including a plurality of contiguous substantially concentric pitch segments of variable wedge angle between the optical axis and maximum periphery of the transmission area, a maximum of the wedge angle and dimension of the transmission area establishing a f/# for the lens smaller than the selected f/# of the projection system; and a plural number of lenses in a population of lenses having common design parameters and smaller transmission areas and f/#'s ranging from smaller to greater than the selected f/# for the projection system, each for interposing in a diverging projection path of a light image to refract the projected light image into substantially collimated image light within one of the smaller transmission areas.

2. A lens of claim 1 including an image filter mounted in spaced relationship to the pitch segments.

3. A population of lenses according to claim 1 including lenses in a range that extends from a lens of large transmission area having an f/# smaller than the f/# of the projection system and not less than said established f/# to a lens of smaller transmission area having an f/# larger than the f/# of the projection system.

4. An optical system comprising:

an image projection system for transmitting a diverging light image along a projection path to an image-viewing screen of selected dimension disposed at a selected distance along the projection path, the selected distance and selected dimension establishing a f/# for the projection system;

a Fresnel lens interposed along the projection path to substantially collimate the diverging light image, the lens having a f/# within not greater than about ±25% variation from the f/# of the projection system.

5. An optical system according to claim 4 in which the Fresnel lens interposed along the projection system includes optical design parameters common to a population of not less than 2 Fresnel lenses having f/#'s within not greater than about ±14% variation from the f/# of the projection system.

6. An optical system according to claim 4 in which the population includes at least 3 Fresnel lenses having f/#'s within not greater than about ±10% variation from the f/# of the projection system.

7. An optical system according to claim 4 in which the population of Fresnel lenses of different dimensions are formed from the lens of largest dimension and lowest f/# in the population.

8. An optical system according to claim 5 in which the population of Fresnel lenses of different dimensions are formed from the lens of largest dimension and lowest f/# in the population.

9. A method for forming a population of Fresnel lenses of different f/#'s for substantially collimating projected image light within a projection system having a selected f/#, the method comprising:

forming a primary Fresnel lens of the population having a selected light transmission area at an f/# smaller than the selected f/# of the projection system;

cutting lenses of the population from the primary Fresnel lens having smaller light transmission areas than the selected area of the primary lens and having f/#'s larger than the f/# of the primary lens.

10. The method according to claims 9 in which the population of lenses includes different f/#'s within not greater than ±25% variation in f/#'s about the selected f/#.

11. The method according to claim 9 in which the population of lenses includes at least two lenses with f/#'s that vary not greater than ±14% of the selected f/#.

12. The method according to claims 9 in which the population of lenses includes at least three lenses having f/#'s that vary not greater than ±10% of the selected f/#.

13. The method of claim 9 for operation with an image-enhancing light filter, the method comprising:

attaching one of the population of the Fresnel lenses having pitch segments disposed adjacent the light filter at a very small spacing therebetween including air.

14. The method according to claim 12 in which the light filter includes a layer of optically-transmissive beads in contiguous array, the method comprising:

attaching the one of the Fresnel lenses with the pitch segments disposed near the layer of beads at a spacing therebetween including air.

* * * * *

UNITED STATES PATENT AND TRADEMARK OFFICE
CERTIFICATE OF CORRECTION

PATENT NO. : 6,700,713 B2  Page 1 of 1
APPLICATION NO. : 10/211785
DATED : March 2, 2004
INVENTOR(S) : Charles Robert Wolfe It is certified that error appears in the above-identified patent and that said Letters Patent is hereby corrected as shown below:

On the Title Page, Item (56) References Cited, under U.S. PATENT DOCUMENTS, please replace "6,049,814 4/2000 Karlsson, et al" with --6,046,847 4/2000 Takahashi--

On the Title Page, Abstract, line 3,
please add --image-- between conventional and projection On the Title Page, Abstract, line 4,
please replace "ted" with --projected--

On the Title Page, Abstract, line 6,
please replace "Substantially" with --substantially--

Column 6, line 4,
please replace "f/#'s" with --f/#s--

Column 6, line 15
please replace "f/#'s" with --f/#s--

Column 7, line 7
please replace "claims" with --claim--

Signed and Sealed this

First Day of January, 2008

JON W. DUDAS
*Director of the United States Patent and Trademark Office*